April 29, 1958 C. H. BACHMAN 2,832,871

ELECTRICAL CIRCUIT CONNECTION DEVICE

Filed April 11, 1957

INVENTOR.
CHARLES H. BACHMAN
BY Robert H. Fraser
ATTORNEY

United States Patent Office 2,832,871
Patented Apr. 29, 1958

2,832,871

ELECTRICAL CIRCUIT CONNECTION DEVICE

Charles H. Bachman, Manhattan Beach, Calif., assignor to The Ramo-Wooldridge Corporation, a corporation of Delaware Application April 11, 1957, Serial No. 652,233
12 Claims. (Cl. 200—142)

This invention relates to electrical circuit connection devices and more particular to a new and improved temperature sensitive one operation electrical circuit connection device.

Many types of devices or switches for establishing an electrical circuit connection in response to a change in temperature are well known. One common type is the conventional thermostat containing a bi-metallic element which expands and contracts in accordance with temperature changes to open and close a set of electrical contacts. Less well known is the type of temperature sensitive electrical switch which is adapted to establish an electrical connection at a predetermined temperature with the switch being subject to a single actuation so that after the switch has been actuated and the electrical circuit connection has been established, the connection remains in existence notwithstanding further changes in temperature. One use for single operation temperature sensitive switches is in fire alarm systems where it is essential that an electrical circuit be closed when the ambient temperature surrounding the switch rises to a predetermined level.

Generally, temperature sensitive single actuation switches include moving mechanical parts to establish an electrical connection. In an electrical switch having mechanical moving parts, a failure to operate may arise from dirt or other contamination entering the mechanism, defects in mechanical assembly, as well as from failure of a mechanical element. Being capable of only a single actuation, testing and quality control to eliminate the possibility of failure is difficult in this type of switch. Thus, in critical applications where it is essential that the switch properly close without failure, a degree of reliability is required of which previously known switches are incapable.

Accordingly, it is an object of the present invention to provide a new and improved electrical circuit connection device which is adapted to close an electrical circuit without the movement of mechanical parts.

It is another object of the present invention to provide a new and improved electrical circuit connection device having an extremely high degree of reliability.

It is still another object of the present invention to provide a new and improved electrical circuit connection device which operates within a sealed off enclosure free from contamination.

It is an additional object of the present invention to provide a temperature sensitive electrical circuit connection device which has a fast and positive closure at a predetermined temperature.

Briefly, in accordance with the invention, there is provided an electrical circuit connection device including an enclosure which surrounds portions of at least two electrodes which are normally insulated one from the other, and a quantity of a special material which is confined within the enclosure. The special material is of a type in which a metallic element is held in a non-conductive state over a given range of temperatures with the metallic element being deposited to form an electrical connection between the electrodes when the material reaches a predetermined temperature. In one embodiment of the invention the device is equipped with means for raising the temperature of the device to the predetermined temperature to cause the device to establish an electrical connection.

A better understanding of the invention may be had from a reading of the following detailed description and an inspection of the drawing, in which.

Figure 1:
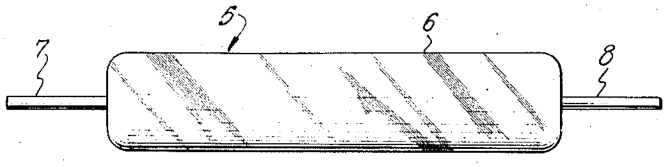
Fig. 1 is an elevational view of an electrical circuit connection device constructed in accordance with the present invention.

In Fig. 1 there is shown an electrical circuit connection device 5 which includes a sealed off airtight enclosure 6. Through the ends of the enclosure 6 extend a pair of electrodes 7 and 8 to which the enclosure 6 is sealed. The enclosure 6 may be constructed of any non-conducting material, although glass is preferable. The electrodes 7 and 8 are constructed of electrically conducting material which should have as near a thermal co-efficient of expansion to the enclosure 6 as possible. Where the enclosure 6 is constructed of glass, several materials for the electrodes 7 and 8 having coefficients of expansion to match that of particular types of glass are well known. One such material is "Kovar."

Figure 2:
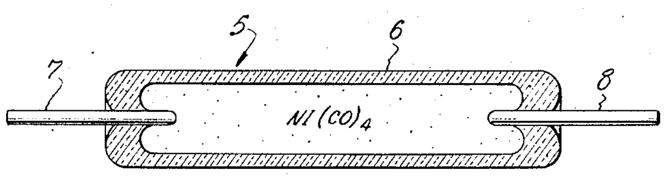
Fig. 2 is a sectional view of the device of Fig. 1.
Figure 3:
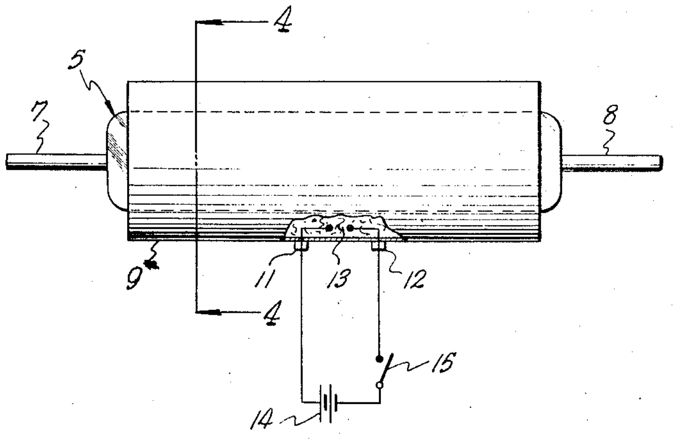
Fig. 3 is an elevational view of an electrical circuit connection device along with means for actuating the device through the application of heat.

Within the enclosure 6 a special material is confined which sustains a metallic element in chemical composition over a range of temperatures. The special material is adapted to deposit the metallic element in the form of a conductor between the electrodes 7 and 8 when the material is brought to a predetermined temperature. A material which may be confined in the enclosure 6 for this purpose is a composition made up of the chemical carbonyl radical combined with a metallic element. In the group of metallic elements which may be combined with the carbonyl radical are included nickel, iron, molybdenum and platinum. For example, in a particular embodiment nickel carbonyl, $Ni(CO)_4$, is placed within the enclosure 6 in a vapor or liquid state at or near atmospheric pressure. Nickel carbonyl has the characteristic that at approximately 200° centigrade decomposition occurs in which the nickel is deposited as a metallic film on the surface of the container with carbon dioxide being released. Thus, when the device 5 of Figs. 1–3 is elevated to 200° centigrade, a conductive nickel coating is formed on the inner surface of the enclosure 6 electrically connecting the electrodes 7 and 8 which closes the switch.

In assembling the device 5, the enclosure 6 and the electrodes 7 and 8 should be as free from contamination by either gaseous or solid material as possible. Substantially all residual air should be pumped from the enclosure 6 prior to filling the enclosure 6 with the special material. A separate tubulation may be used to pump and fill the enclosure 6 which is later sealed, or one of the electrodes 7 and 8 may be in the form of a hollow tube which is crimped after filling to seal the enclosure 6.

To control the thickness of the metal which is deposited to close the switch, and hence control the internal resistance of the switch in closed position, the special material may be diluted by a suitable gas, such as nitrogen, which does not react with the special material.

For a discussion of the properties of the special material nickel carbonyl, along with a description of a method for preparing the material, reference is made to vol. V of Mellor's Comprehensive Treatise on Inorganic Chemistry, at pages 953–961.

Although the device 5 of Figs. 1–3 may be used as a temperature sensitive single operation switch, as for example in fire alarm systems, in some applications where a highly reliable single operation switch is desired, the device 5 may be equipped with means for heating the enclosure 6 to the temperature at which the switch is closed.

Figure 4:
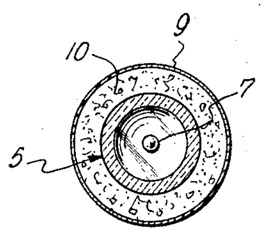
Fig. 4 is a sectional view of the apparatus of Fig. 3 taken along line 4—4.

In Fig. 4 there is shown an electrical circuit connection device 5 surrounded by a sleeve 9 filled with a suitable heat generating material 10, such as thermite, which is capable of being ignited by an electric spark. The terminals 11 and 12 are connected to a spark gap 13, and a battery 14 or other suitable source of electrical energy is connected serially with a switch 15 between the terminals 11 and 12. When the switch 15 is closed, a spark appears at the spark gap 13 and the thermite material 10 is ignited thereby generating an intense heat which rapidly elevates the temperature of the enclosure 6 to the point at which the material within the switch deposits the metallic coating between the electrodes 7 and 8 which closes the switch.

The electrical circuit connection device of the invention used either alone or in conjunction with means for actuating the device by heating, provides a new and improved means for closing an electrical circuit. In addition to the advantages of having the switch operate within a sealed off enclosure so that the switch is free of contamination, the lack of any moving mechanical part in the switch affords a reliability of operation and ease of manufacture not heretofore known.

Although a specific material, nickel carbonyl, has been suggested, and a group of related materials are mentioned above, it will be appreciated that the special material confined within the enclosure 6 is not limited thereto and may comprise any material having similar characteristics within the scope of the invention.

What is claimed is:

1. A temperature sensitive electrical circuit connection device including the combination of an airtight enclosure, at least two electrodes extending within the enclosure, and a quantity of nickel carbonyl sealed within the enclosure which is adapted to deposit a conductive layer of nickel between the electrodes at a predetermined temperature to form an electrical connection.

2. A temperature sensitive electrical circuit connection device including the combination of an enclosure, at least two electrodes extending within the enclosure which are normally insulated one from the other, and a quantity of non-combustible material sealed within the enclosure which includes a metallic element held in composition in a non-conductive state, said material being sensitive to heat externally applied to the enclosure to deposit the metallic element at a predetermined temperature as a metallic film between the electrodes to form an electrical connection therebetween.

3. A temperature sensitive electrical circuit connection device including the combination of at least two electrodes, a sealed enclosure surrounding a portion of each of the electrodes, said electrodes being normally insulated one from the other, a quantity of non-combustible material sealed within the enclosure which includes a metallic element held in an electrically non-conductive state in a chemical composition over a range of temperatures, said material being sensitive to heat externally applied to the enclosure to deposit the metallic element in an electrically conducting state upon reaching a predetermined temperature to form an electrical connection between the electrodes, and means entirely external to the enclosure and adjacent thereto for applying heat to the enclosure to bring the enclosure to a predetermined temperature whereby the metallic element is deposited to form an electrical connection between the electrodes to provide an electrical circuit through the electrical circuit connection device.

4. A temperature sensitive electrical circuit connection device including the combination of at least two electrodes which are normally insulated each from the other, a quantity of non-combustible material confined with a portion of the electrodes, said material including a composition bearing a metallic element held in an electrically non-conductive state over a given range of temperatures and said material, when raised to a predetermined temperature in response to heat externally applied to the enclosure, being adapted to deposit the metallic element as an electrical conductor between the electrodes.

5. A single operation electrical switch including the combination of an airtight enclosure, at least two electrodes extending within the enclosure, a quantity of a composition including the carbonyl chemical radical, and a metallic element chemically combined with the carbonyl radical so that the metallic element is held in a non-conductive state over a given range of temperatures, said material being adapted to decompose at a predetermined temperature at which the metallic element is deposited as an electrical connection between the electrodes to close the switch.

6. A one operation electrical switch which is adapted to close at a predetermined temperature including the combination of an airtight enclosure, at least two electrodes extending within the airtight enclosure, and a quantity of nickel carbonyl sealed within the enclosure, said nickel carbonyl being adapted to deposit metallic nickel when raised to a predetermined temperature with the metallic nickel forming an electrical connection between the electrodes.

7. A single operation electrical switch including the combination of an airtight enclosure, at least two electrodes extending within the enclosure, a quantity of a composition including the carbonyl chemical radical and a metallic element chemically combined with the carbonyl radical so that the metallic element is held in a non-conductive state over a given range of temperatures, said material being adapted to chemically separate at a predetermined temperature at which the metallic element is deposited as an electrical connection between the electrodes to close the switch, and means for bringing the enclosure to said predetermined temperature to actuate the switch.

8. A one operation electrical switch which is adapted to close at a predetermined temperature, including the combination of at least two electrodes, an airtight glass enclosure surrounding a portion of each of the electrodes, a quantity of a material which is a composition of a metallic element and the carbonyl radical captured within the glass enclosure, said material being adapted to sustain the metallic element in a non-conductive state over a given range of temperatures, said material being further adapted to deposit the metallic element as a conductor between the electrodes at a predetermined temperature, and means for heating the enclosure to actuate said switch.

9. Apparatus in accordance with claim 8 in which said means for heating the enclosure comprises a quantity of Thermite material surrounding a portion of the enclosure, and means for igniting the Thermite material to raise the temperature of the enclosure to said predetermined temperature.

10. A one operation electrical switch which is adapted to close at a predetermined temperature including the combination of at least two electrodes which are normally insulated each from the other when the switch is open, an airtight glass enclosure surrounding a portion of each of the electrodes, a quantity of nickel carbonyl ($Ni(CO)_4$) captured within the glass enclosure, said nickel carbonyl being adapted to sustain the nickel in a non-conductive state over a given range of temperatures, and said nickel carbonyl further being adapted to decompose at a predetermined temperature at which the nickel is deposited on the glass enclosure between the electrodes to form an electrical connection to close the switch.

11. Apparatus in accordance with claim 10 including means for heating the enclosure comprising a quantity of Thermite material surrounding a part of the enclosure, and means for igniting the Thermite material to raise the temperature of the enclosure to said predetermined temperature.

12. A one operation electrical switch which is adapted to close at a predetermined temperature including the combination of at least two electrodes which are normally insulated each from the other when the switch is open, an airtight glass enclosure surrounding a portion of each of the electrodes, a quantity of nickel carbonyl ($Ni(CO)_4$) captured within the glass enclosure, said nickel carbonyl being adapted to sustain the nickel in a non-conductive state over a given range of temperatures, said nickel carbonyl further being adapted to decompose at a predetermined temperature at which the nickel is deposited on the glass enclosure between the electrodes to form an electrical connection to close the switch, a sleeve surrounding a portion of the glass enclosure, a quantity of Thermite material packed between the sleeve and the enclosure, and an electrical spark generating gap positioned adjacent the Thermite material for igniting the Thermite material to raise the temperature of the enclosure to said predetermined temperature to close the switch.

References Cited in the file of this patent

UNITED STATES PATENTS 2,725,821 Coleman ---------------- Dec. 6, 1955
2,786,918 Rosenberg ------------- Mar. 26, 1957

OTHER REFERENCES

Mellor: "Comprehensive Treatise on Inorganic Chemistry," vol. V, pp. 953–961.